Figure 1:
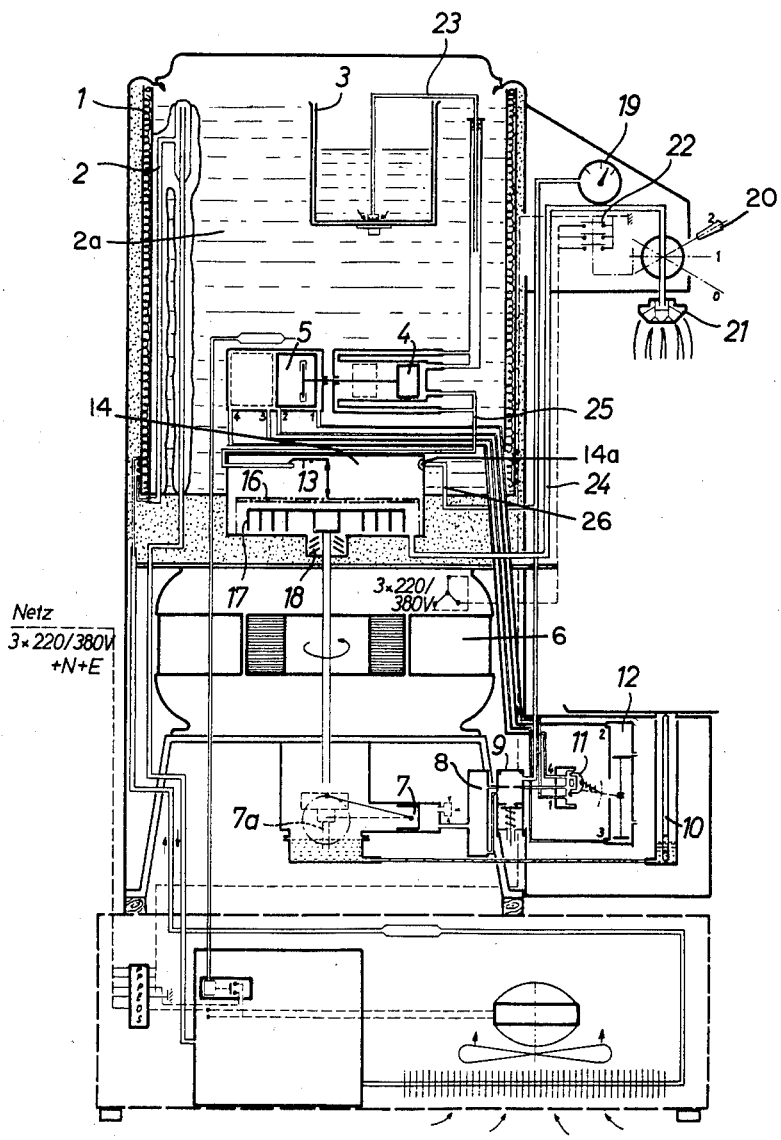

Dec. 28, 1965  E. BÄNZIGER  3,226,100
APPARATUS FOR PRODUCING WHIPPED CREAM
Filed June 14, 1963  2 Sheets-Sheet 1

Inventor
Ernst Bänziger
By Richard Ch...
Agt

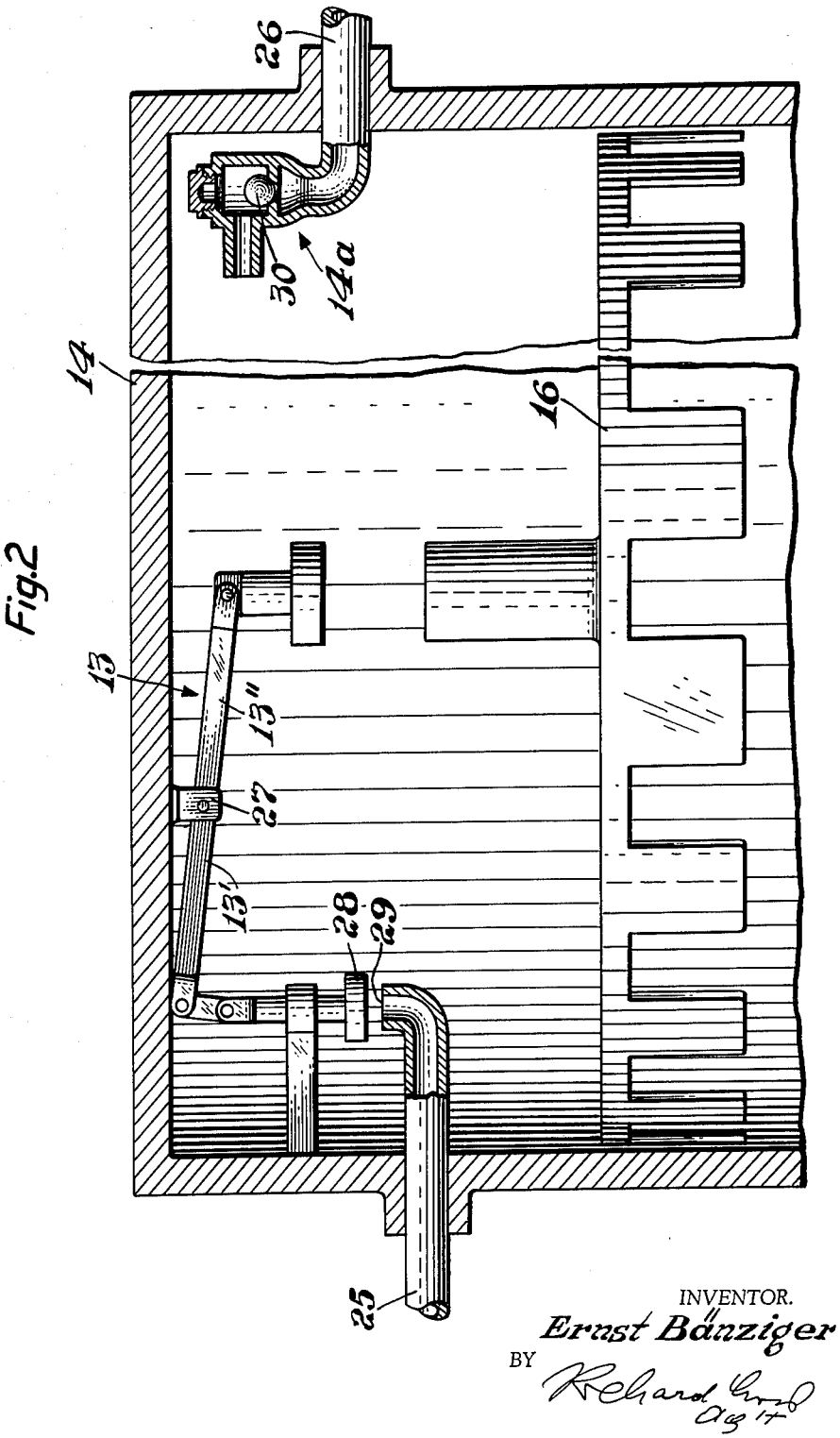

3,226,100
APPARATUS FOR PRODUCING WHIPPED CREAM
Ernst Bänziger, Grenzstrasse 1,
St. Margrethen, Switzerland
Filed June 14, 1963, Ser. No. 288,044
Claims priority, application Germany, June 18, 1962,
B 67,715
4 Claims. (Cl. 261—140)

The present invention relates to an apparatus for producing whipped cream which, by a mere turn of a lever from one position to another, permits any desired amount of whipped cream to be dispensed from the apparatus as long as any cream remains in the cream container of the apparatus.

The essential features of the apparatus according to the invention reside in providing a mixing chamber for cream and air with a valve-controlled outlet line, a cream supply line which is associated with a feed pump, and an air supply line which is also associated with a feed pump, and in providing means for cooling at least the cream supply line and the mixing chamber by means of ice water. There are a cream inlet valve in the cream supply line, and a float in the mixing chamber for closing the cream inlet valve, when being raised to an elevated position in the mixing chamber.

The apparatus according to the invention maintains a mixture of cream and air under a high pressure in the mixing chamber so that it may be dispensed therefrom at any time. The mixture of cream and air forms a liquid which, when the pressure is released and the mixture leaves through the outlet line and through the outlet valve, is transformed at an increase in volume into finished whipped cream of the usual consistency. By means of the apparatus according to the invention it is possible to transform dairy cream with a fat content of 35% automatically into whipped cream which thereafter may be used directly for consumption or for decorating purposes or the like. It is even possible to dilute full-strength dairy cream with sugar-sweetened or unsweetened milk to a fat content of, for example, 30%, and to treat this diluted mixture in the new apparatus so that a stiff, appetizing whipped cream may be discharged therefrom in a condition ready for immediate use.

The mixing ratio of cream and air, for example, a ratio of 1:1 may in this manner be kept constant at all times in the mixing chamber. The pressure in the mixing chamber is maintained at a value of 4 to 5 atm., for example, by means of the pumps which are associated with the supply lines, and as the result of the refrigeration by ice water, the material passing through the apparatus is maintained at a temperature of 1 to 3° C. When the mixture of cream and air passes through the outlet valve of the apparatus and is transformed into normal whipped cream, this mixture increases about three times in volume. The whipped cream which is then attained remains firm for a long time even at ordinary room temperature, and it retains its given shape which is very important if the whipped cream is to be used for decorating cakes, puddings, or the like. It may then be filled into and squeezed out of a pastry tube.

The above-mentioned as well as numerous additional features and advantages of the present invention will become more clearly apparent from the following detailed description which is to be read with reference to the accompanying drawings of a preferred embodiment of the apparatus according to the invention.

In the drawings, FIG. 1 is an overall schematic elevation of the setup of an apparatus for producing whipped cream, embodying features of the invention; and FIG. 2 shows a partly sectioned detail to enlarged scale.

Referring to the drawings in greater detail, the apparatus according to the invention comprises an insulated ice water container 1 in which a cream container 3 is mounted so as to be immersed in the ice water 2a. The cream container 3 which is preferably removable from the ice water container 1 is preferably open at its upper end through which a suction pipe 23 extends to a level near the bottom of the container 3. This suction pipe 23 may be U-shaped and is connected to a cream pump 4, 5. One leg of this U may be telescopically adjustable to permit its length to be varied.

The cream pump 4, 5 is connected to a cream supply line 25 which leads to a mixing chamber 14. Pump 4, 5 and at least a part of the mixing chamber 14 are mounted within the ice water container 1. At least an end portion of an air supply line 26 passes likewise through the container 1 and leads into the mixing container 14.

In the particular embodiment of the invention as illustrated in the drawing, the cream pump 4, 5 is a pneumatic piston pump, the work piston 5 of which is pneumatically operated. By means of a control cylinder 12 and a distributing slide valve 11 the proper amount of compressed air is supplied to the mixing chamber 14 so that despite the prevailing pressure of, for example, 5 atm., the piston 5 is moved relatively slowly and the air is passed uniformly into the mixing chamber 14. A float 16 in the mixing chamber 14 is adapted to act upon and to open and close a valve 27, 28 which is mounted on the end of the cream supply line 25 as soon as the volume ratio of the air and cream amounts, for example, to 1:1. Pump 4, 5 then stops although it remains ready to operate and to pump cream into the mixing chamber 14 in accordance with the amount of the mixture of air and cream which is withdrawn.

A motor 6 is adapted to drive a mixing arm 17 to mix the cream with the air in the mixing chamber 14. An outlet line 24 leads from the mixing chamber 14 to an outlet valve 21.

Motor 6 operates a compressor 7 which generates the required compressed air and forces the same into the mixing chamber 14. The crankshaft of the compressor is mounted within an oil bath 7a which is connected by a line to an oil gauge 10. The compressed air which has been generated is purified of any possible oil particles in an intermediate container 8 and a subsequent pressure relief valve 9 before it passes to the mixing chamber 14. The compressed-air line on the mixer 14 contains a check valve 14a. By means of the distributing slide valve 11 and the piston pump 12 compressed air is supplied to pump 4, 5 for the pneumatic operation thereof.

At the end of the outlet line 24 a pressure control valve 21 may be provided which is opened when the pressure in this line exceeds a certain value. Depending upon its position, a lever 20 when formed as a pivotable valve control lever will either open or close the electric circuit leading to the motor 6. A pressure gauge 19 which is preferably connected to the compressed-air line may in this case be omitted since the necessary pressure for effecting a discharge of whipped cream from the pressure valve will be produced inside of the apparatus only by the operation of the motor which is controlled by the operation of a lever 20 and the motor control switch 22.

The numeral 18 indicates a packing box for the mixing arm 17.

For refrigerating the ice water container 1, the refrigerating part 2 of a compressor refrigerator may be mounted within this container, while the other parts of the refrigerator, as shown in the drawing, may be mounted, for example, in the base of the apparatus.

FIG. 2 shows the mixing chamber 14. The float 16 within the mixing chamber is adapted to act upon an end of a two-armed lever 13 which is mounted at 27 for a swinging movement. The lever carries at its other end a disk 28 which is adapted, as the lever swings, to close and open the free end 29 of the cream supply line 25 which terminates within the mixing changer 14.

With the arm 13″ of the lever 13 being heavier than the arm 13′, the arm 13′ is ordinarily in a raised position in which the valve 28, 29 is open and cream is free to enter the chamber 14. As the cream level in the chamber 14 and the float 16 rise, the arm 13″ ascends, and the arm 13′ descensd until the disk 28 closes the open end 29 of the line 25. When the cream level and the float 16 drop, the valve 28, 29 opens again.

Valves of any conventional design may be used to control the cream and air supply to the mixing chamber 14.

In the check valve 14a, a ball 30 in the air supply line 26 assumes instantly its place upon its seat when a reflex or back pressure occurs.

Although my invention has been illustrated and described with reference to a preferred embodiment thereof, I wish to have it understood that it is in no way limited to the details of such embodiment, but is capable of numerous modifications within the scope of the appended claims.

Having thus fully disclosed my invention, what I claim is:

1. An apparatus for producing whipped cream, comprising a mixing chamber for mixing cream and air, an outlet line leading from said mixing chamber, a control valve near the end of said outlet line remote from said chamber, a cream supply line and an air supply line leading to said chamber, a cream feed pump associated with said cream supply line, an air feed pump associated with said air supply line, means for cooling at least said cream supply line and said chamber by means of ice water, a cream inlet valve in said cream supply line, and a float in said chamber for closing said cream inlet valve when raised to an elevated position in said chamber.

2. The apparatus as defined in claim 1, in which said cooling means constitutes a container holding ice water, a cream container is immersed in said ice water, a suction pipe connects said cream feed pump with said cream container and is U-shaped, and the leg of the U located outside of said cream container is telescopically adjustable to vary the length thereof.

3. An apparatus as defined in claim 1, in which said cooling means comprise an ice water container and a compression refrigerator having a refrigerating part mounted in said ice water container.

4. An apparatus as defined in claim 1, further comprising a pressure valve mounted in said outlet line near the end thereof and adapted to open in response to a predetermined pressure in said outlet line, a mixing tool in said mixing chamber, a motor for driving said pumps, and said mixing tool, and a control valve in said outlet line near said pressure valve adapted to be moved to different positions so as to close the electric circuit for operating said motor and to interrupt said circuit.

References Cited by the Examiner
UNITED STATES PATENTS

| | | | |
|---|---|---|---|
| 927,008 | 7/1909 | Smell | 222—62 |
| 1,798,095 | 3/1931 | Manley | 222—135 |
| 3,097,764 | 7/1963 | Loeser | 222—63 |
| 3,133,726 | 5/1964 | Tarukawa | 222—67 |
| 3,168,217 | 2/1965 | Nilsen et al. | 222—4 |

LOUIS J. DEMBO, *Primary Examiner.*

NORMAN L. STACK, *Assistant Examiner.*